United States Patent
Rosenfeldt et al.

(10) Patent No.: US 6,749,045 B2
(45) Date of Patent: Jun. 15, 2004

(54) PASSIVE FORCE ELEMENT ON THE BASIS OF ELECTRORHEOLOGIC LIQUIDS

(75) Inventors: Horst Rosenfeldt, Gross-Zimmern (DE); Eckhard Wendt, Koengen (DE); Hans-Joachim Faulstroh, Schmiechen (DE); Frank Schroeter, Moosburg (DE); Horst Scherk, Ober-Ramstadt (DE); Dorothea Adams, Buettelborn (DE)

(73) Assignees: Carl Schenck AG, Darmstadt (DE); Bayerische Motorenwerke Aktiengesellschaft, Munich (DE)

( * ) Notice: Subject to any disclaimer, the term of this patent is extended or adjusted under 35 U.S.C. 154(b) by 0 days.

(21) Appl. No.: 10/181,344
(22) PCT Filed: Jan. 10, 2001
(86) PCT No.: PCT/EP01/00230
§ 371 (c)(1),
(2), (4) Date: Nov. 14, 2002
(87) PCT Pub. No.: WO01/51826
PCT Pub. Date: Jul. 19, 2001

(65) Prior Publication Data
US 2003/0127293 A1 Jul. 10, 2003

(30) Foreign Application Priority Data
Jan. 15, 2000 (DE) .......................... 100 01 420

(51) Int. Cl.⁷ ................................. F16F 9/53
(52) U.S. Cl. ................. 188/267.1; 188/267.2; 188/266.2; 188/269; 188/282.2; 188/297; 188/313
(58) Field of Search ............... 188/267, 267.1, 188/267.2, 266.1, 266, 266.2, 269, 282.2, 297, 301, 313

(56) References Cited

U.S. PATENT DOCUMENTS 4,790,522 A 12/1988 Drutchas
4,819,772 A 4/1989 Rubel (List continued on next page.)

FOREIGN PATENT DOCUMENTS

DE 3443183 5/1986
DE 3712349 10/1988

(List continued on next page.)

OTHER PUBLICATIONS

D. J. Jendritza (ED.), "Technischer Einsatz Neuer Aktoren", Expert–Verlag, Renningen–Malmsheim, 1995, Chapter 3.2.1 and Fig. 3.1.
D. A. Brooks "Selection of Commercial Electro–Rheological Devices", Proceedings of the fourth International Conference on Electrorheological Fluids, 1994, pp. 643 to 656.
S. B. Choi et al., "Control characteristics of a continuously variable ER damper", Elsevier Science Ltd.; Mechatronics, vol. 8 No. 2, Mar. 1, 1998, pp. 143–161.

*Primary Examiner*—Jack Lavinder
*Assistant Examiner*—Devon Kramer
(74) *Attorney, Agent, or Firm*—W. F. Fasse; F. G. Fasse

(57) ABSTRACT

A passive force element on the basis of electrorheological liquids includes a piston with a piston rod guided in a cylindrical housing, and a force introduction element connected with the piston rod. The piston forms, in the cylindrical housing, two variable-volume working chambers, which are filled with electrorheological liquids, and which are connected by a fluid connection including a valve arrangement with an electrorheological liquid valve for controlling the throughflow characteristic. A regulated damping characteristic can be adjustedly set and force peaks are avoided, because the force introduction is achieved via the force introduction element, and the piston is coupled onto the force introduction element via an elastic element.

20 Claims, 1 Drawing Sheet

U.S. PATENT DOCUMENTS

| | | | |
|---|---|---|---|
| 4,896,752 A | | 1/1990 | Shtarkman |
| 5,018,606 A | * | 5/1991 | Carlson ................... 188/267.1 |
| 5,316,112 A | * | 5/1994 | Kimura et al. ........... 188/267.1 |
| 5,449,150 A | * | 9/1995 | Watanabe et al. ........ 267/64.24 |
| 5,458,217 A | * | 10/1995 | Ohishi .................... 188/267.1 |
| 5,477,946 A | * | 12/1995 | Kawamata et al. ...... 188/267.1 |
| 5,489,009 A | * | 2/1996 | Kawamata et al. ...... 188/267.1 |
| 5,588,509 A | | 12/1996 | Weitzenhof et al. |
| 5,884,959 A | * | 3/1999 | Hillen ....................... 293/134 |
| 6,152,488 A | * | 11/2000 | Hedderly et al. .......... 280/775 |
| 6,189,919 B1 | * | 2/2001 | Sinnhuber et al. ......... 280/731 |
| 6,375,220 B1 | | 4/2002 | Kamm |
| 6,419,057 B1 | * | 7/2002 | Oliver et al. ............ 188/267.2 |

FOREIGN PATENT DOCUMENTS

| | | |
|---|---|---|
| DE | 3904071 | 8/1989 |
| DE | 3905639 | 9/1989 |
| DE | 4002448 | 8/1990 |
| DE | 19717692 | 10/1998 |
| DE | 19749970 | 5/1999 |
| DE | 19820570 | 11/1999 |
| EP | 0382171 | 8/1990 |
| EP | 0769637 | 4/1997 |
| EP | 0882636 | 12/1998 |
| FR | 1419551 | 10/1965 |
| GB | 1278764 | 6/1972 |
| GB | 1381785 | 1/1975 |
| GB | 1599565 | 10/1981 |
| JP | 5-187471 | 7/1993 |
| WO | WO99/22162 | 5/1999 |

\* cited by examiner

PASSIVE FORCE ELEMENT ON THE BASIS OF ELECTRORHEOLOGIC LIQUIDS

BACKGROUND OF THE INVENTION

Passive force elements are used not only in motor vehicles. Since every moving object generates kinetic energy in a direction change or a stop, this energy must be taken up in a manner that is as controlled as possible. Known simple elements for taking up the kinetic energy are springs or rubber elements, however the stored energy must be dissipated elsewhere.

In the article "Selection of Commercial Electrorheological Devices", Proceedings of the Fourth International Conference on Electrorheological Fluids, 1994, pages 643 to 656, D. A. Brooks, FIG. 2 schematically shows a passive force element on the basis of electrorheological liquids. In this known force element, the kinetic energy of a moving object is transmitted via the piston rod with piston to the electrorheological liquid. The damping characteristic or the energy dissipation of the force element is regulated by an adjustable throttle opening, through which the electrorheological liquid flows during a shock impact. The adjustment of the throttle opening is achieved by applying a changeable voltage to the electrodes of a valve on the basis of electrorheological liquids, which operates in the squeeze mode.

Electrorheological liquids are liquids of which the Theological characteristics are controllable by the electrical field. Generally, electrorheological liquids are suspensions, i.e. solid particles suspended in a carrier medium, which are polarizable by the electrical field. Through the use of electrorheological liquids, it has become possible to embody actuators without moving parts or to considerably reduce the number of the moving parts.

Energy converters or transducers of electrorheological liquid actuators possess electrode arrangements, between which the electrorheological liquid is located, and onto which is applied the electrical control voltage. The interaction between the electrode arrangement and the electrorheological liquid can, dependent on the type of the liquid deformation, be distinguished among three basic modes, the shear mode (electrodes slide or shift relative to one another in parallel planes), the flow mode (electrodes are rigidly arranged, the liquid flows through between the electrodes) and the squeeze mode (electrodes vary their spacing distance relative to one another). These modes can also arise in combination. Further details in this regard are in the book: "Technischer Einsatz neuer Aktoren" ("Technical Application of New Actuators"), Expert-Verlag publisher, Renningen-Malmsheim, 1995, chapter 3.2.1 and FIG. 3.1.

In the above described known passive force element on the basis of electrorheological liquids, there arises a disadvantage due to the indirect control of the throttle opening by the valve on the basis of electrorheological liquids. Therefor, the regulation of the damping characteristic is only possible to a limited extent in this force element. During the shock impact process, undesired force peaks can act on the body that is to be braked or slowed down. Moreover, leakage losses of the force element cannot be compensated.

A main development goal of the automobile manufactures is the optimization of the cooperative interaction of vehicle occupants and restraint systems. The increased complexity of these systems, such as for example the airbag system and adaptive restraint systems, require the use of passive force elements, of which the damping characteristic is adjustable in a targeted and reproducible manner. Moreover, for example, a main characteristic or feature is the reduction of the maximum reaction forces/accelerations on the vehicle occupants.

Force elements are used in motor vehicle steering columns for limiting the impact force of a vehicle occupant onto the steering wheel or the airbag/steering wheel system. Such force elements absorb the kinetic energy of a shock impact, for example through the deformation or the destruction of components consisting of metal or plastic (rolled sheet metal arrangements, tearable or breakable strap). These force elements have the disadvantage that they cannot be used again after a shock impact has been exerted thereon. Moreover, a disadvantage exists therein, that they comprise a fixedly prescribed damping characteristic (force-path-characteristic curve).

Furthermore, from the EP 0 882 636, there is known a steering column with integrated force element, which consists of an outer and inner component. Under the influence of a longitudinal force exerted thereon, the components shift or slide relative to one another, whereby a damping material contained in the outer component becomes liquified, pulverized, or crystalized. In this known arrangement, the damping material must be exchanged after a shock impact has been exerted thereon, which is connected with a considerable effort. Moreover, only a determined force progression can be produced over the displacement path.

From the DE 197 49 970 A1, there is known an occupant safety apparatus for the driver's side of a motor vehicle, in which an energy absorption element in the form of a piston cylinder arrangement is allocated to the steering spindle, which is guided in a shell or sleeve pipe. In the case of a crash, the piston cylinder arrangement of the steering column serves for the energy dissipation of an occupant impacting on the steering wheel. For adapting the damping characteristic to the severity of the accident, a different number of valves are actuated dependent on the mass and the relative velocity of the occupant.

SUMMARY OF THE INVENTION

It is an object of the present invention to further develop a force element in such a manner, so that a regulated damping characteristic can be adjustedly set, and force peaks are avoided.

This object is achieved in that the piston is coupled via an elastic element to the force introduction element, and thereby, in the first moment of a shock impact, an advantageous mass-spring-coupling is achieved, and therewith, force peaks at the beginning of the shock impact are avoided. In the further progression of the shock impact, that is to say after coupling-on of the piston, the piston is moved and the electrorheological liquid is displaced from the one working chamber into the other working chamber. Since the fluid connection connecting the working chambers comprises an electrorheological liquid valve, the damping characteristic can be adjusted by means of the height of the electrical field. In the use of the force element in or on the steering column of motor vehicles, an optimal damping characteristic can be adjustedly set dependent on sensor-measured occupant parameters, such as for example, seating position, the size of the occupants, the weight of the occupants, the seat belt usage (yes or no) and/or the accident severity.

In connection with new discoveries or knowledge of biomechanics, or in connection with law changes, the force element already installed in motor vehicles can further continue to be used through simple adaptation of the control actuation.

By the embodiment or formation of a gas volume in a two-part piston, which consists of a lid part glidingly guided in a hollow cylindrical bottom part, and whereby the piston rod is glidingly supported in the lid part of the piston, only the small mass of the piston rod is accelerated at the beginning of the shock impact. The spring stiffness of the gas volume is very small at the beginning, and progressively varies in the further progression or course. Since the pressure of this gas volume is adjustable, the coupling conditions between piston rod and piston, and therewith the damping characteristic, can be adapted to the respective motor vehicle.

In a further embodiment it is provided, that the fluid connection connecting the working chambers is embodied by two concentrically arranged shells or sleeves forming the cylindrical housing, and the annular gap formed between the shells or sleeves is provided with controlledly energizable electrode surfaces for generating an electrical field. Through this embodiment, a direct regulation of the damping characteristic is possible at every point in time during the shock impact process.

BRIEF DESCRIPTION OF THE DRAWING

In the following, the invention is described in detail in connection with an example embodiment, which is illustrated in the FIG. 1. It is shown by.

DETAILED DESCRIPTION OF A PREFERRED EXAMPLE EMBODIMENT OF THE INVENTION

Figure 1:
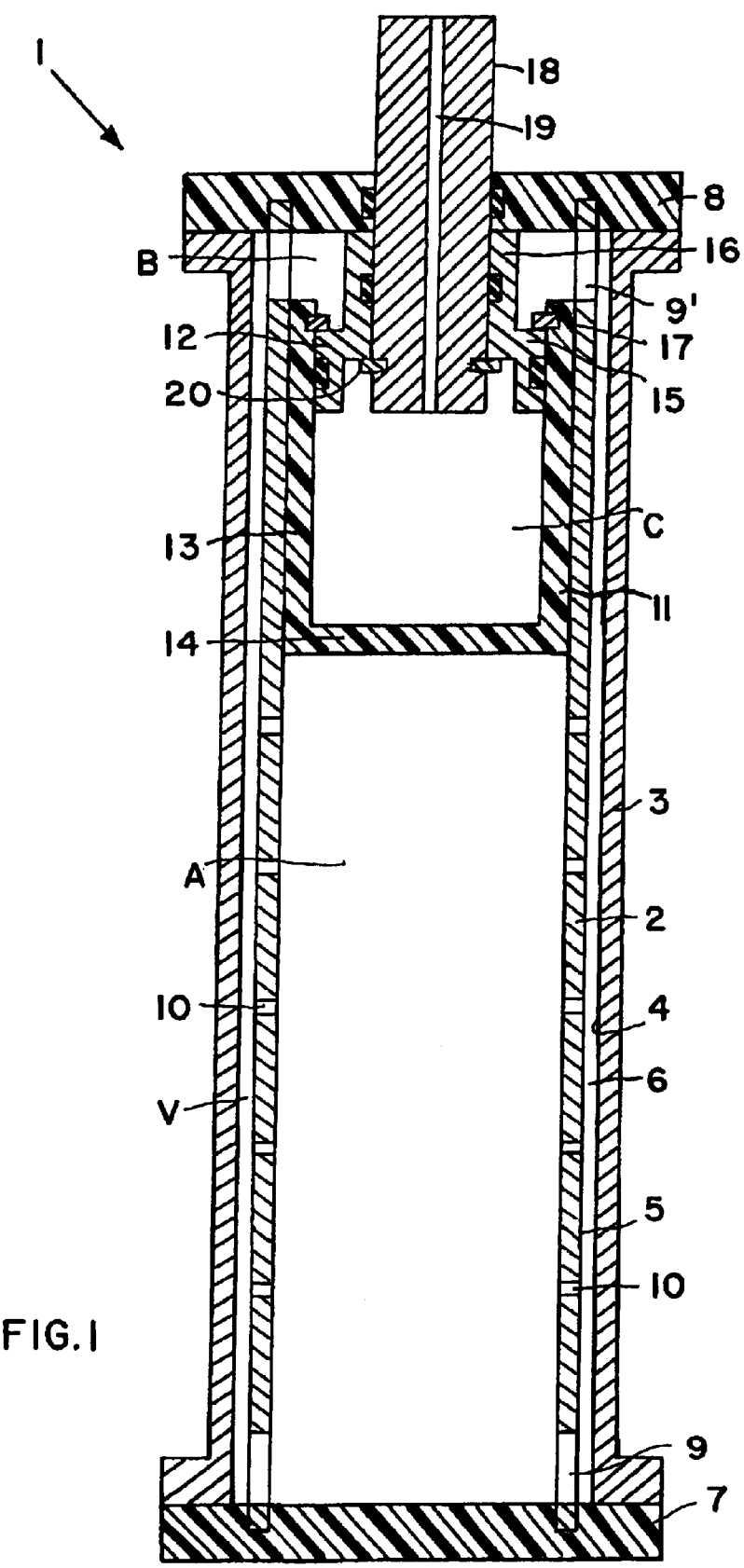
FIG. 1: a longitudinal section through a passive force element in a basic or initial position.

In FIG. 1 there is illustrated a passive force element 1 on the basis of electrorheological liquids, according to the invention.

The force element 1 consists of a first cylindrical sleeve or shell 2, which is surrounded by a second cylindrical sleeve or shell 3. The sleeve 3 is arranged concentrically to the sleeve 2. Thereby, an annular gap 6 remains between the inner shell surface 4 of the sleeve 3 and the outer shell surface 5 of the sleeve 2, whereby the annular gap 6 extends over the entire axial structural length of the sleeves 2, 3. The sleeves 2 and 3 are respectively closed at the ends with a floor part 7 or a lid part 8 in a liquid-tight manner. The floor part 7 as well as the lid part 8 are made of an insulation material. Floor part 7 as well as lid part 8 could also be made of steel and provided with an insulation layer. Radial bored throughholes 9, 9' are formed in the first sleeve 2 respectively at the ends and are arranged distributed over the circumference. Moreover, at an axial spacing distance, further bored throughholes 10 are let in and arranged distributed over the circumference. The bored throughholes 9 let in at the ends comprise a considerably larger diameter than the further axially spacedly arranged bored throughholes 10. The bored throughholes 10 could also comprise various different diameters over the piston stroke. Advantageously, the bored throughholes 10 are embodied in such a manner so that the diameters become smaller from top to bottom.

The first sleeve 2 is divided into two variable-volume working chambers A, B by a piston 11 that is glidingly supported in the first sleeve. The piston 11 is embodied in a two-part manner, and consists of a lid part 12 and a hollow cylindrical bottom part 13, which is closed at one end with a floor part 14. The bottom part 13 is similarly made of an insulation material or is provided with an insulation layer. Thus, a further variable-volume working chamber C is formed between lid part 12 and bottom part 13. For this purpose, the lid part 12 is glidingly guided in the bottom part 13, and essentially consists of a disc-shaped section 15 with cylindrical projection 16. To prevent a sliding-out of the lid part 12 out of the bottom part 13, a stop in the form of a spring ring 17 is arranged on the upwardly extending end portion of the bottom part 13. A bored throughhole is centrally let into the lid part 12, and a piston rod 18 is glidingly supported therein. The piston rod 18 is further guided to the outside in a sealed manner out of the lid part 8. The piston rod 18 is provided with a bored throughhole 19. The working chamber C is filled with a gas through the bored throughhole 19, whereby the gas pressure can be adapted to the expected crash characteristic.

Working chamber A and working chamber B are connected with one another through the bored throughholes 9, 9', 10 as well as the annular gap 6. An electrorheological liquid is placed into the working chambers A, B as well as the annular gap 6. An annular gap valve V on the basis of electrorheological liquids is formed between sleeve 2 and sleeve 3, whereby the electrode surfaces are formed on the one hand by the inner shell surface 4 of the sleeve 3 and on the other hand by the outer shell surface 5 of the sleeve 2. The sleeve 2 is preferably connected with a controllable high voltage supply via an electrical line guided out of the lid part 8. The sleeve 3, lid part 8, piston rod 18 are grounded. Due to the above described construction, the chamber A is connected with the working chamber B through the annular gap valve V. The viscosity of the electrorheological liquid can be controlled in the annular gap 6 by an electrical high voltage signal. Hereby the pressure difference between the two cylinder chambers A and B, and therewith the damping characteristic of the force element, can be adjusted via the height of the electrical field.

The position of the piston 11 with piston rod 18 in the sleeve 2 shown in FIG. 1, shows a basic or initial adjustment of the force element 1, in which no force introduction takes place into the piston rod 18 via a force introduction element, which is not shown. In this basic or initial adjustment, the piston rod 18 moves out of the working chamber C of the piston 11 up to a mechanical stop 20. Since the working chamber C is filled with gas, the electrorheological liquid located in the working chamber A, B is similarly acted on with a pressure via the two oppositely moveably supported piston parts: lid part 12, bottom part 13. Since the effective piston surfaces of the bottom part 13 or of the lid part 12 facing the working chambers A or B have different sizes, the piston 11 is driven or moves up to the stop, which is formed by the end face of the cylindrical projection 16, against the lid part 8.

The force element 1 is secured to a locationally fixed component via the sleeve 3. Now, a body moves relative to this component, whereby the kinetic motion energy of this body is to be nullified in a defined manner. Via a force introduction element, which is not illustrated, the impact shock is transmitted onto the piston rod, which is glidingly guided in the lid part 8 and the lid part 12, and which penetrates into the gas-filled working chamber C of the piston 11. Hereby, the elastic element is formed by the gas volume. At the beginning of the shock impact, the small mass of the piston rod 18 is accelerated. The spring stiffness of the gas volume in the working chamber C is, at the beginning, very small, and varies progressively during the further progression. In the further progression of the shock impact, the piston rod 18 moves downwardly in a vertical direction, whereby the gas volume of the working chamber C is compressed. Hereby, the internal pressure in the working chamber C increases and a counterforce against the shock impact force is generated. While the piston rod 18 moves into the working chamber C, that is to say maximally as soon as the piston rod 18 contacts onto the floor part 14, the piston 11 moves downwardly in the vertical direction, whereby the electrorheological liquid in the working chamber A is accelerated. During the downward movement of the piston 11, the electrorheological liquid can partially be pressed through the bored throughholes 10 into the annular gap 6, while a major portion of the electrorheological liquid is, however, pressed into the annular gap 6 through the bored throughholes 9 and flows through the entire length of the annular gap into the working chamber B. A volume compensation of the piston rod that moves into the working chamber B during the movement of the piston 11 is achieved by the moveable lid part 12, which moves downwardly into the bottom part 13 of the piston 11 during the movement of the piston 11. Moreover, there is provided a control arrangement, which is not illustrated, and which is connected with the high voltage source. By corresponding controlled activation of the annular gap valve, that is to say by variation of the electrical field in the annular gap 6, a desired damping characteristic can be adjustedly set.

Instead of the use of an electrorheological liquid as pressure medium, a magnetorheological liquid can also be utilized. With the use of magnetorheological liquids, electrically actuatable coil arrangements are provided instead of the electrode surfaces.

The force element described in connection with FIG. 1 may, for example, be installed in or on the steering column of a motor vehicle. In that context, the airbag/steering wheel system forms the already described force introduction element, and the outer sleeve 3 is formed by a main component part of the steering column. The force element according to the invention could also be adapted externally on an existing steering column. In this context it could also be advantageous to adapt two or three force elements on one steering column. Through the use of the force element in or on the steering column, an optimal damping characteristic, that is to say force-path-characteristic curve, can be adjustedly set, dependent on the occupants, that is to say the seating position, the size of the occupants, the weight of the occupants, the safety belt use (yes or no) and/or the accident severity. For this, corresponding sensors must be provided, whereby the sensor signals are conducted further to the control arrangement. The damping characteristic can also be influenced with respect to the force level and progression during the crash, that is to say during the shock impact process. The force element according to the invention may furthermore be utilized in the knee protection in motor vehicles. In this application, the force introduction element is embodied as an impact contact plate allocated to the motor vehicle interior cabin trim. Moreover, the force element can be arranged between motor vehicle structure and bumper in order to nullify the collision impact energy in smaller collisions.

What is claimed is:

1. A passive force element on the basis of electrorheological liquids, in which there is arranged a piston with a piston rod, which is guided in a cylindrical housing, whereby the piston rod is connected with a force introduction element, and whereby the piston forms, in the cylindrical housing, first and second variable-volume working chambers, which are filled with an electrorheological liquid, and which are connected via a fluid connection, and whereby the fluid connection comprises a valve arrangement for controlling a throughflow characteristic of the electrorheological liquid through the valve arrangement, which comprises an electrorheological liquid valve, characterized in that, a force introduction is achieved via the force introduction element, the piston is coupled onto the force introduction element via an elastic element formed by a gas volume that is arranged in the piston and can be acted on by the force introduction element, and the piston comprises at least one movably supported boundary wall.

2. The passive force element according to claim 1, whereby the piston is embodied in a two-part manner and comprises a lid part glidingly guided in a hollow cylindrical bottom part, and whereby a third variable-volume working chamber is formed between the lid part and the bottom part, and whereby the piston rod is glidingly supported in the lid part of the piston.

3. The passive force element according to claim 2, whereby the piston rod is provided with bored throughhole and the third variable-volume working chamber is connected with a gas pressure reservoir through the bored throughhole.

4. The passive force element according to claim 1, whereby the fluid connection connecting the first and second variable-volume working chambers is formed by two concentrically arranged sleeves forming the cylindrical housing, and an annular gap formed between the sleeves is provided with actuatable electrode surfaces for generating an electrical field.

5. The passive force element according to claim 4, whereby an inner one of the two sleeves is provided with bored throughholes at an end thereof, and further is provided with axially spacedly arranged additional bored throughholes.

6. A combination of the passive force element according to claim 1 in and/or on a steering column of a motor vehicle.

7. A combination of the passive force element according to claim 1 in a knee protection arrangement in a motor vehicle.

8. A combination of the passive force element according to claim 1 arranged between a vehicle structure and a bumper of a motor vehicle.

9. A passive force element on the basis of electrorheological liquids, in which there is arranged a piston with a piston rod, which is guided in a cylindrical housing, whereby the piston rod is connected with a force introduction element, and whereby the piston forms, in the cylindrical housing, first and second variable-volume working chambers, which are filled with an electrorheological liquid, and which are connected via a fluid connection, and whereby the fluid connection comprises a valve arrangement for controlling a throughflow characteristic of the electrorheological liquid through the valve arrangement, which comprises an electrorheological liquid valve, characterized in that a force introduction is achieved via the force introduction element, the piston is coupled onto the force introduction element via an elastic element, the fluid connection connecting the first and second variable-volume working chambers is formed by two concentrically arranged sleeves forming the cylindrical housing, and an annular gap formed between the sleeves is provided with actuatable electrode surfaces for generating an electrical field.

10. The passive force element according to claim 9, whereby the elastic element is formed by a gas volume that can be acted on by the force introduction element.

11. The passive force element according to claim 10, whereby the gas volume is arranged in the piston, and the piston comprises at least one movably supported boundary wall.

12. The passive force element according to claim 11, whereby the piston is embodied in a two-part manner and comprises a lid part glidingly guided in a hollow cylindrical bottom part, and whereby a third variable-volume working chamber is formed between the lid part and the bottom part, and whereby the piston rod is glidingly supported in the lid part of the piston.

13. The passive force element according to claim 12, whereby the piston rod is provided with a bored throughhole and the third variable-volume working chamber is connected with a gas pressure reservoir through the bored throughhole.

14. The passive force element according to claim 9, whereby an inner one of the two sleeves is provided with bored throughholes at an end thereof, and further is provided with axially spacedly arranged additional bored throughholes.

15. A combination of the passive force element according to claim 9 in and/or on a steering column of a motor vehicle.

16. A combination of the passive force element according to claim 9 in a knee protection arrangement in a motor vehicle.

17. A combination of the passive force element according to claim 9 arranged between a vehicle structure and a bumper of a motor vehicle.

18. A force damping element comprising:
   a hollow cylindrical housing;
   a piston arranged movably in said housing so as to separate from each other first and second variable-volume working chambers on opposite sides of said piston in said housing, wherein said piston comprises a hollow piston body having a piston chamber filled with a gas therein and a piston boundary wall that is movably supported relative to said hollow piston body so as to be variably movable into said piston chamber;
   a liquid selected from electrorheological liquids and magnetorheological liquids, disposed in said first and second variable-volume working chambers;
   a liquid connection path fluidically interconnecting said first and second variable-volume working chambers and passing through a valve arrangement including a rheologically active valve selected from an electrorheological liquid valve and a magnetorheological liquid valve; and
   a piston rod that is coupled to said piston so as to act on said gas in said piston chamber while being movable relative to said hollow piston body, and that extends from said piston out of said cylindrical housing.

19. The force damping element according to claim 18, wherein said piston rod passes slidably through said piston boundary wall into said piston chamber.

20. A force damping element comprising:
   a hollow cylindrical housing including concentrically arranged inner and outer sleeves with an annular gap therebetween;
   a piston arranged movably in said housing so as to separate from each other first and second variable-volume working chambers on opposite sides of said piston in said housing;
   a liquid selected from electrorheological liquids and magnetorheological liquids, disposed in said first and second variable-volume working chambers;
   a liquid connection path through said annular gap, fluidically interconnecting said first and second variable-volume working chambers and passing through a valve arrangement including a rheologically active valve selected from an electrorheological liquid valve including electrically energizable electrode surfaces provided in or bounding said annular gap and adapted to generate an electrical field in said annular gap, and a magnetorheological liquid valve including an electrically energizable electromagnetic coil provided in or bounding said annular gap and adapted to generate a magnetic field in said annular gap; and
   a piston rod that is coupled via an elastic coupling to said piston, and that extends from said piston out of said cylindrical housing.

* * * * *